United States Patent [19]

Sato

[11] Patent Number: 4,604,748
[45] Date of Patent: Aug. 5, 1986

[54] DATA PROCESSING SYSTEM WITH ERROR CORRECTION

[75] Inventor: Fumitaka Sato, Tokyo, Japan

[73] Assignee: Tokyo Shibaura Denki Kabushiki Kaisha, Kawasaki, Japan

[21] Appl. No.: 567,912

[22] Filed: Jan. 3, 1984

[30] Foreign Application Priority Data

Jan. 24, 1983 [JP] Japan .................................. 58-8772

[51] Int. Cl.$^4$ ...................... G06F 11/10; G11C 29/00
[52] U.S. Cl. .................................... 371/38; 360/38.1; 360/53; 371/68
[58] Field of Search ....................... 371/37, 38, 39, 40, 371/68; 360/38.1, 53

[56] References Cited

U.S. PATENT DOCUMENTS

| 4,105,997 | 8/1978 | McGinn ............................ 371/37 X |
| 4,328,580 | 5/1982 | Stockham, Jr. et al. .......... 371/68 X |
| 4,334,309 | 6/1982 | Bannon et al. ..................... 371/38 |
| 4,413,335 | 11/1983 | Clements et al. ................ 371/68 X |

OTHER PUBLICATIONS

J. S. Conzola et al., Error Correction Without Speed Degradation, IBM Technical Disclosure Bulletin, vol. 10, No. 8, Jan. 1968, pp. 1275-1276.

Primary Examiner—Charles E. Atkinson
Attorney, Agent, or Firm—Cushman, Darby & Cushman

[57] ABSTRACT

In a picture data record/playback system, picture data and code data is recorded onto two fields of a record, which fields constitute a single picture in an optical disk unit. When the picture data is subjected to a cyclic redundancy check and an error is detected, the first error correction, for which the bit error rate of error correction is not too high, is applied to the picture data. The code data is doubly recorded onto the optical disk unit. Both items of recorded data are compared to each other. When such items are not coincident with each other, the CRC check is applied to both items of data which are doubly recorded. The valid code data is then selected. Further, when an error is detected, a CPU executes a second error correction, under program control, of which the bit error rate for error correction is not too low.

12 Claims, 16 Drawing Figures

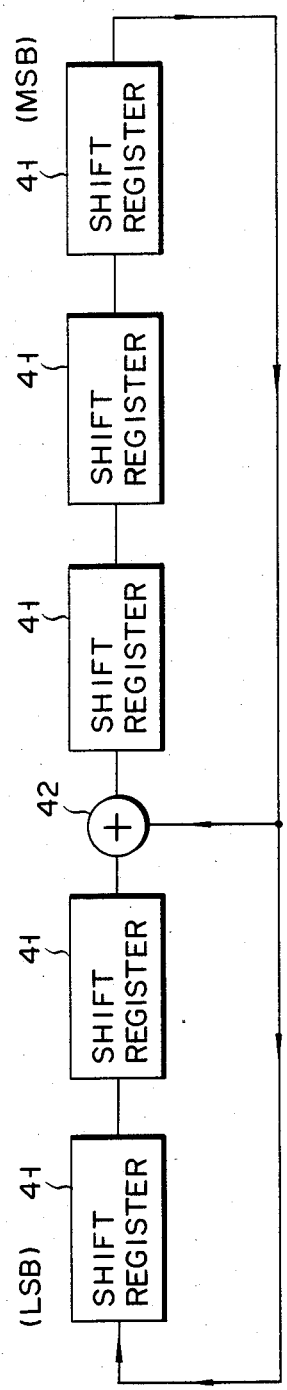
F I G. 4
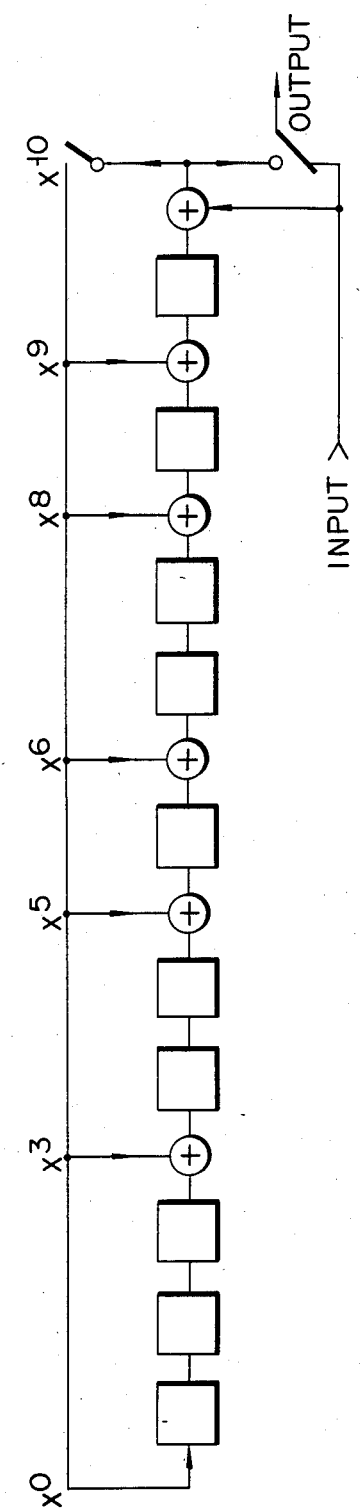
F I G. 5

DATA PROCESSING SYSTEM WITH ERROR CORRECTION

BACKGROUND OF THE INVENTION

The present invention relates to the error processing of a data error which occurs in the recording or playing back of picture data and code data onto and from an optical disk in a picture data record/playback system for recording picture data on a document; e.g., for recording picture data onto an optical disk and playing it back therefrom, as required.

In recent years, a tremendous amount of documents have been produced, in offices and factories, for example. For the electronic processing of such documents, a picture data record/playback system has been developed. In this system, the picture data on a document is optically read out by a two dimensional scanning method. The picture data thus read out is sequentially stored in a recording medium, such as an optical disk. The retrieval data for individual picture data is stored in a recording medium, such as a floppy disk. In reading out the desired picture data from the optical disk, a retrieval code associated with the desired picture data is input into the system. The data read out is visualized by a CRT device or a printer.

This type system is defective, however, in that the optical disk used is physically damaged by dust particles attached thereto or being deposited thereon when it is handled. When damaged, the damaged optical disk incorrectly plays back the picture data from a damaged portion of the optical disk.

Generally, the picture data has high redundancy. Accordingly, the picture data may be recorded on the optical disk, allowing for the errors contained therein, to some extent. Code data such as character text and retrieval words has a much lower quantity than picture data. Therefore, for the code data, the probability of the error occurrence must be extremely low. As for the data amount of both the picture data and the code data, one page of a document of A4 size needs a memory capacity of approximately 600 KB in case that the picture data in the one page document is treated as binary picture with a 0.1 mm resolution. A character test (in Japanese) having picture data of 60 characters×50 lines on one page of an A4 size document may be expressed by 6 kilo bytes (5 KB), at most.

Errors contained in two types of data with different error tolerances must be appropriately processed. In so far as we know, however, data processors with such error correction ability have not yet been developed.

SUMMARY OF THE INVENTION

Accordingly, a primary object of the present invention is to provide a data processing system which can perform error correction on two types of data having different error tolerances, with a high degree of accuracy.

To achieve the above object, a data processing system is provided which handles a large amount of primary data allowing error occurrence at a low frequency level, and a small amount of secondary data allowing error occurrence at a very low frequency level, which system has a memory device with a large capacity for storing the primary and secondary type data at an insufficiently low error frequency; said data processing system being comprised of: first error correction means for correcting errors in the primary and secondary data, so that the primary and secondary data is set within its tolerable error ranges when the primary and secondary data is read out from or written into the memory with a large capacity; and secondary correction means for correcting the errors in the secondary data, so that the primary and secondary data is set within a tolerable error range, in order to apply two stages of error correction to the secondary data.

BRIEF DESCRIPTION OF THE DRAWINGS

Other objects and features of the present invention will be apparent from the descriptions of the accompanying drawings summarized below:

FIGS. 4 and 5 are block diagrams of an example of an encoding circuit;

DETAILED DESCRIPTION OF THE PREFERRED EMBODIMENTS

One embodiment of a picture data record/playback system according to the present invention may be described as follows, with reference to the accompanying drawings.

Figure 1:
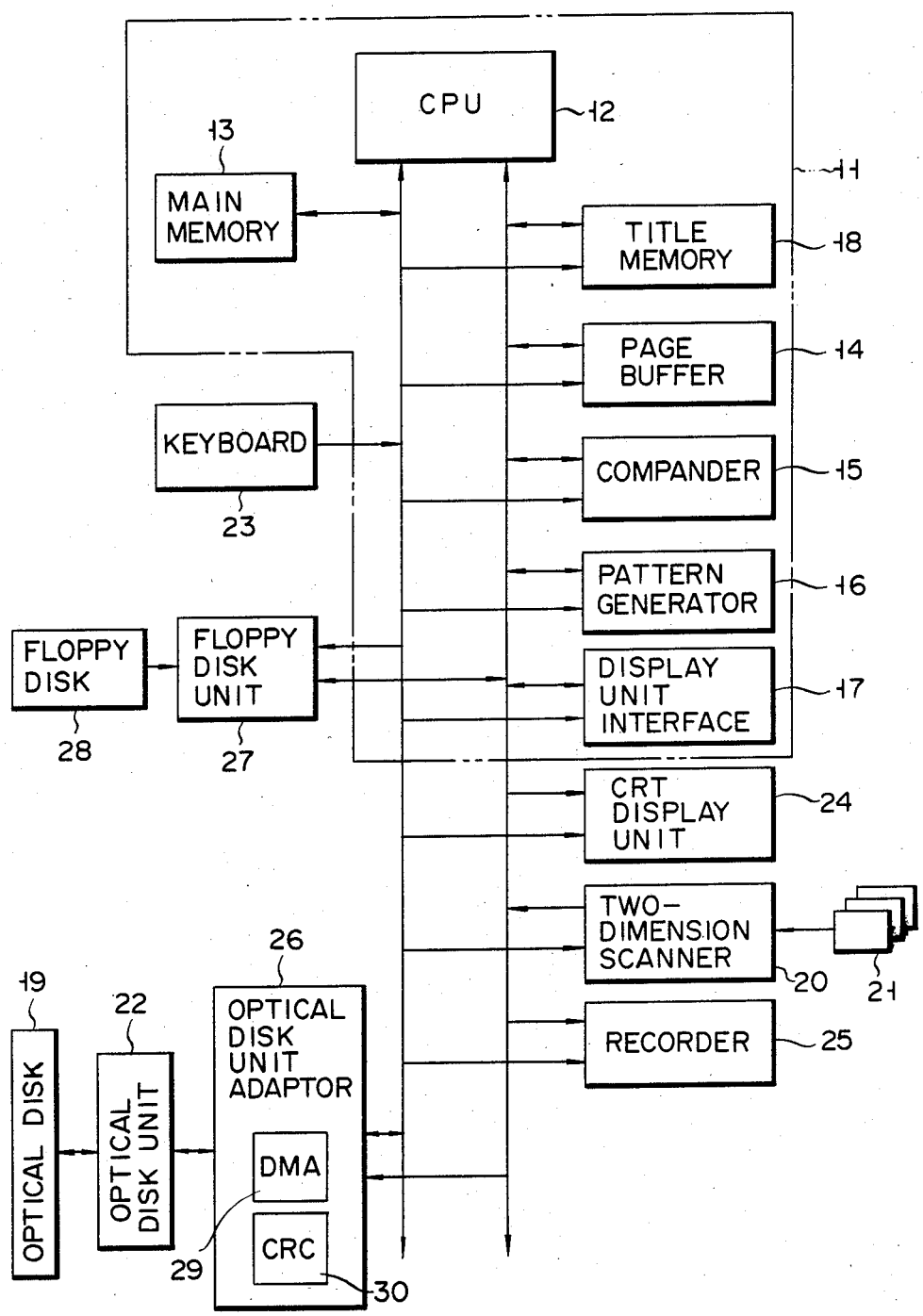
FIG. 1 is a block diagram illustrating an overall data processing system which is an embodiment of the present invention.

FIG. 1 shows the scheme of a picture data record/playback system according to the present invention. In this system, reference numeral 11 designates a main control unit. A CPU 12 executes various types of controls in this system. Numeral 13 designates a main memory. A buffer memory 14, e.g., a page buffer, has a memory capacity capable of storing picture data of at least one unit (with the data amount corresponding to 2304 lines of one page of an A4 size document). A compander 15 compresses the picture data (lessens the redundancy of the picture data) and expands the picture data (restores the compressed redundancy to the original state). A pattern generator 16 stores pattern data such as characters and symbols. Numeral 17 represents a display interface. A title memory 13 stores retrieval data read out from a keyboard 23 to be given later. A read device or a two-dimensional scanner 20 two-dimensionally scans an original (document) 21 by a laser beam to produce electrical signals representing the picture data on the original 21. An optical disk unit 22 is used for sequentially storing in a data recording medium 19, such as an optical disk, picture data read out by the two-dimensional scanner 20 and supplied through the main control unit 11. An optical disk unit adaptor 26 contains a DMA 29 and a CRC computing circuit 30. A 8257 Programmable DMA Controller, manufactured by Intel Corp. in USA, may be used as the DMA 29. A MC8503 UNIVERSAL POLYNOMIAL GENERATOR, manufactured by Motorola Inc. in USA may be used for the CRC computing circuit 30. Since the data transfer speed of the floppy disk unit 27 is high, the computation of the CRC is executed by the hardware 30.

Figure 2:
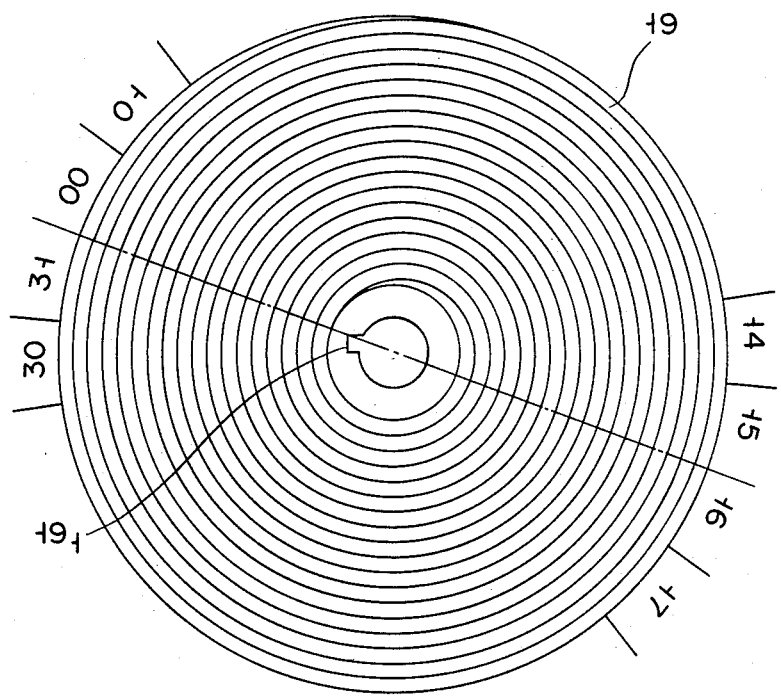
FIG. 2 is a plan view of an optical disk.

As shown in FIG. 2, the surface of a circular substrate made of, e.g., glass or plastic, has a metal layer laid thereon in a spiral fashion, which substrate is made of tellurium or plastic, for example. A cut away portion, i.e., a reference position mark $19_1$, is formed near the center of the metal layer. The disk surface is divided into 32 sectors 0 to 31, with sector 0 serving as the reference position mark $19_1$. Further, the track number 1 and the succeeding ones are assigned to the spiral grooves on the optical disk 19, from the inside to the outside, respectively.

A keyboard 23 is employed in keying in the specific retrieval codes associated with the picture data and various types of operation codes. An output unit 24, for example, a CRT unit as a display unit, displays the picture data which is read out by the two-dimensional scanner 20 and supplied through the main control unit 11. The CRT unit and the display interface 17 in the main control unit 11 cooperate to form a picture data display device. A recorder 25 produces, in the form of a hard-copy, the picture data which is read out by the two-dimensional scanner 20 and supplied through the main control unit 11, or the picture data read out from the optical disk unit 22 and supplied through the main control unit 11. A floppy disk unit 27 stores the retrieval data in a floppy disk 28.

Figure 3A:
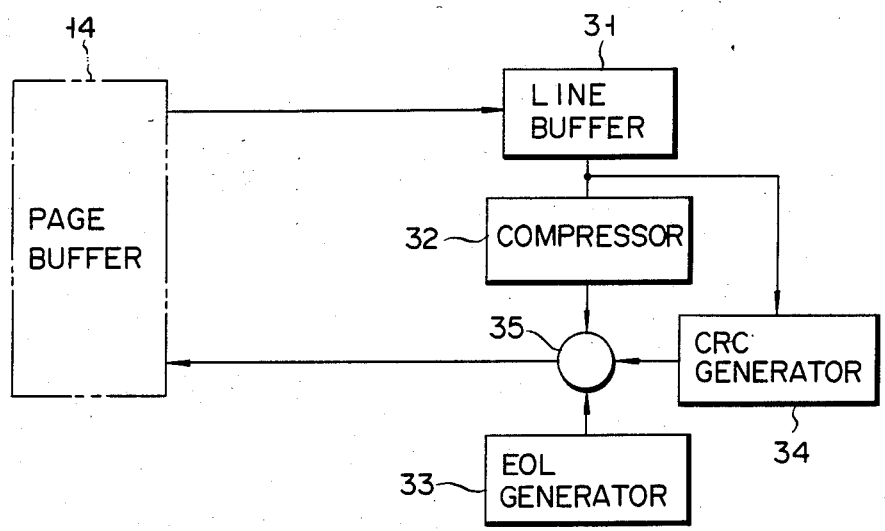
FIGS. 3A and 3B are block diagrams schematically illustrating a compander circuit.
Figure 3B:
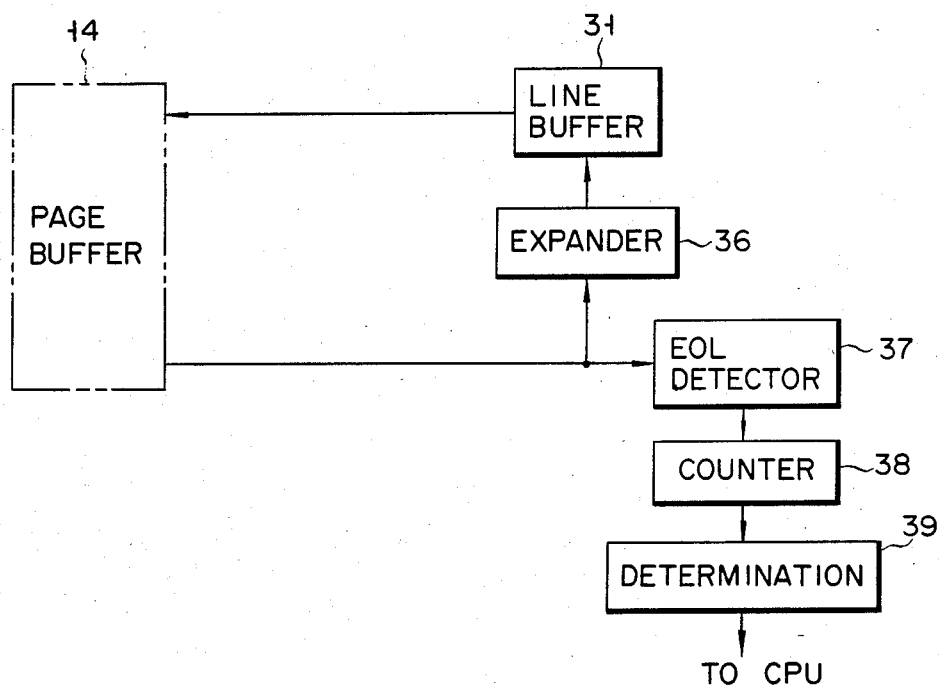
Figure 6:
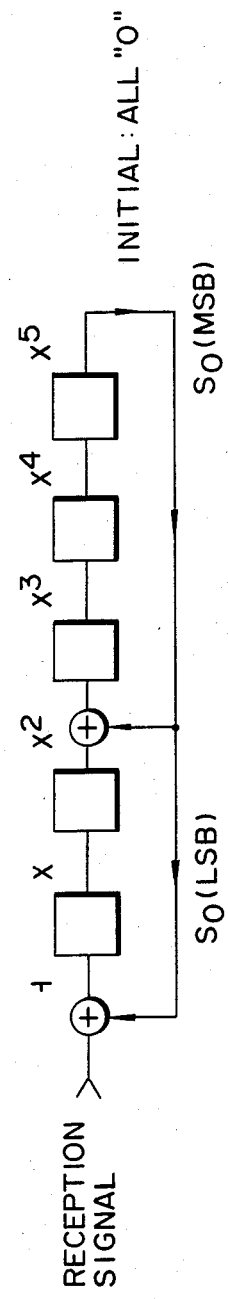
FIGS. 6 and 7 schematically illustrate an example of an encoding circuit.
Figure 7:
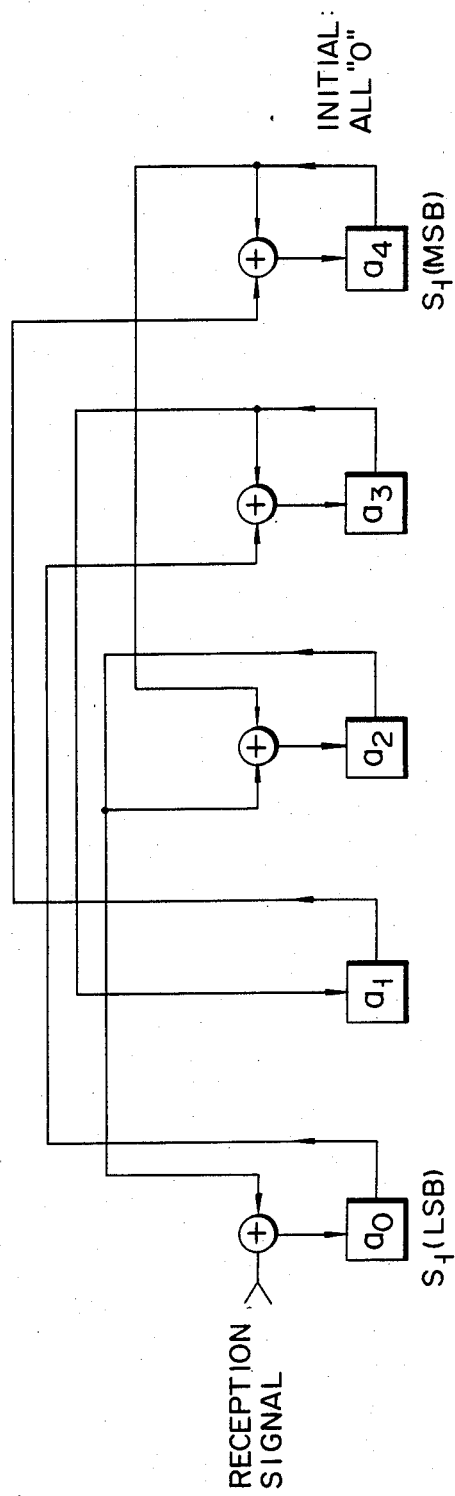

The compander 15 has the arrangement shown in FIG. 3. In a compression mode, the compander 15 is comprised of a line buffer 31 with one scanning line; a buffer memory of exactly 1728 bits; a compressor 32 (MH conversion); an EOL generator 33 for generating an end of line code (EOL) of 13 bits, which represents the end of one scanning line; a CRC generator 34 for generating a cyclic redundancy check code of 4 bits as a second check code, for every picture image of one scanning line; and a summing circuit 35 for summing the EOL and CRC codes at the end of one scanning line, for every item of conversion picture data of one scanning line. In this connection, the CRC code is the remainder when the picture data of one scanning line is divided by a generator ($X^4 + X + 1$). In an expansion mode, the compander 15 is composed of the line buffer 31; the expander 36 (MH reverse conversion); an EOL detector 37 for detecting an EOL added to the converted picture; a counter 38 for counting the results of detection by the EOL detector 37; and a judging circuit 39 for judging whether or not the number of lines of the converted picture has reached a predetermined number of lines, e.g., 2297 lines, by the count of the counter 33.

The error correction of the FIG. 1 system is classified into a first error correction and a second error correction. The first error correction is performed in the optical disk unit 22. An error bit rate is reduced from approximately $10^{-4}$ to $10^{-8}$ by the optical disk unit 22. Data is recorded on the optical disk 19 in an array of pits with 2 $\mu$m/bit intervals. Therefore, even with dust particles having a diameter of 20 $\mu$m, burst errors of 10 bits are caused. Most of the errors to be corrected are caused by dust particles with a diameter of 20 $\mu$m or less. The occurrence rate of dust particles of 20 $\mu$m or more among existing dust particles is generally from $10^{-6}$ to $10^{-7}$.

Allowing for the nature of the errors, the first error correction means employs a Bose-Chaudhuri-Hocquenghen code (BCH code), in which 10 check bits are used for data of 21 bits. The BCH code has the highest correction capacity among the known random error correction codes, and has versatility in its application. Further, this coding system may be considered an extension of the known Hamming code.

In the Hamming code, the mth degree primitive polynomial is treated as a generator, a code length n is equal to $2^M - 1$ (i.e., $n = 2^M - 1$), and a single error in the data bit may be corrected by a code of $k = 2^m - 1 - m$. A parity check matrix H is expressed as follows:

$$H = [\alpha^0, \alpha_1^1, \ldots, \alpha^{n-1}] \qquad (1),$$

where $\alpha$ is M1(x), which is an irreducible polynomial of the m-th degree on a Galois field GF(2) having a root of the primitive element of a Galois field GF($2^m$). In a multiplicative group G, if the elements belonging to the multiplicative group G are all expressed by the power of an element Q in the multiplicative group G, the G is called a cyclic group and the Q is called a primitive element. Hence, the BCH code constitutes a cyclic group. To extend the Hamming code into a BCH code, in correcting double errors, the number of roots satisfying a code polynomial is increased. Another root $\alpha^2$ of the may be provided as the root of M1(x1), being coincident with the Hamming code.

Let us consider a code having roots of $\alpha$ and $\alpha^3$. Let the minimum polynomials of the roots be M1(x) and M3(x), respectively. Under such conditions, this code is composed of a generator and parity check matrix h, as given below.

$$G(x) = LCM(M_1(x), M_2(x)) \qquad (2)$$

$$H = \begin{pmatrix} \alpha^0 & \alpha^1 & \alpha^2 & \ldots & \alpha^{n-1} \\ (\alpha^3)^0 & (\alpha^3)^1 & (\alpha^3)^2 & \ldots & (\alpha^3)^{n-1} \end{pmatrix} \qquad (3)$$

If an error occurs at the (j,j)th digit, syndrome S may be expressed as follows:

$$S = \begin{pmatrix} S_0 \\ S_1 \end{pmatrix} \qquad (4)$$

$$S_0 = \alpha^j + \alpha^j \qquad (5)$$

$$S_1 = (\alpha^3)^j + (\alpha^3)^j \qquad (6),$$

where $S_0$ and $S_1$ are values calculated from the upper and lower halves of the syndrome. If the remainder of the syndrome S is 0, no error is detected. This state either indicates that no error occurs or that error detection is impossible. If the remainder is not zero, it may be judged that an error has occurred.

As indicated above, the syndrome is the superposition of the syndrome values by a single error. Error correction may be performed by solving equation (6).

An encode/decode circuit based on the BCH code is basically composed of shift registers 41 and an adder 42, as shown in FIG. 4. A BCH (31, 21) code has, in the form of a generator, the product G(x) of minimum polynomials M1(x) and M3(x), with the roots of elements $\alpha$ and $\alpha^3$ of the Galois field GF ($2^5$).

$$\alpha; M_1(x) = 1 + x^2 + x^5 \quad (7)$$

$$\alpha^3; M_3(x) = 1 + x^2 + x^3 + x^4 + x^5 \quad (8)$$

$$G(x) = M_1(x) \times M_3(x) = 1 + x^3 + x^5 + x^6 + x^8 + x^9 + x^{10} \quad (9)$$

The parity check matrix may be expressed as follows:

$$H = \begin{pmatrix} \alpha^0 & \alpha^1 & \alpha^2 & \ldots & \alpha^{30} \\ (\alpha^3)^0 & (\alpha^3)^1 & (\alpha^3)^2 & \ldots & (\alpha^3)^{30} \end{pmatrix} \quad (10)$$

$$= \begin{pmatrix} \alpha^0 & \alpha^1 & \alpha^2 & \ldots & \alpha^{30} \\ \alpha^0 & \alpha^3 & \alpha^6 & \ldots & \alpha^{28} \end{pmatrix}$$

where $\alpha^3$ is a vector of the 5th dimension and $$\alpha^{31} = \alpha^0 = \begin{pmatrix} MSB \\ 0 \\ 0 \\ 0 \\ 0 \\ 1 \\ LSB \end{pmatrix}.$$

Each component of $\alpha^3$ represents the contents of each register when $\alpha^0$, as an initial value, is input into an arithmetic circuit (as shown below) and is shifted $j$ times.

Encoding circuit

A code polynomial F(x) is given by the following equation:

$$F(x) = x^{10}P(x) + R(x) = Q(x)G(x) \quad (11),$$

where Q(x) and R(x) are a quotient and a remainder, when a code polynomial P(x) of 21 data bits and $X^{10}P(X)$ are divided by a generator G(x). This would indicate that, if no error occurs at the time of decoding, the sequence of receiving signals may be exactly divided by the generator G(x). In the encoding circuit of FIG. 5, the contents of each of the resistors are so initialized as to be "0's". Then, switch S1 is turned to the down contact (as viewed in the drawing) and switch S2 is closed. The 21-bit data is sequentially output from the highest order, and downward to the output terminal. The output data is also applied to a shift register (a dividing circuit designed on the basis of the generator). Switch S1 is then turned to the up contact. With this circuit connection, the remainder R(x) is duly sent to the output terminal.

Decoding circuit

The syndrome wherein $$S = \begin{pmatrix} S_0 \\ S_1 \end{pmatrix}$$

may be obtained in the following manner. $S_0$ and $S_1$ are both 5th dimensional vectors which may be obtained on the basis of a receiving signal $$R = \overset{LSB}{(\gamma_0, \gamma_1, \gamma_2, \ldots, \gamma_{30})}\overset{MSB}{(\gamma_j = 0 \text{ or } 1)},$$

using the following equations.

$$S_0 = (\ldots (\gamma_{30}\alpha + \gamma_{29})\alpha + \gamma_{28})\alpha + \ldots + \gamma_0) \quad (12)$$

$$S_1 = (\ldots (\gamma_{30}\alpha^3 + \gamma_{29})\alpha^3 + \gamma_{28})\alpha^3 + \ldots + \gamma_0) \quad (13)$$

$$S_0; M_1(x) = 1 + x_2 + x_5$$

$$S_1; M_1(x) = 1 + x_2 + x_5$$

$$1 \cdot \alpha^3 = \alpha^3$$

$$\alpha \cdot \alpha^3 = \alpha^4$$

$$\alpha^2 \cdot \alpha^3 = \alpha^5 = 1 + \alpha^2$$

$$\alpha^3 \cdot \alpha^3 = \alpha^6 = \alpha + \alpha^3$$

$$\alpha^4 \cdot \alpha^3 = \alpha^7 = \alpha^2 + \alpha^4$$

Figure 8:
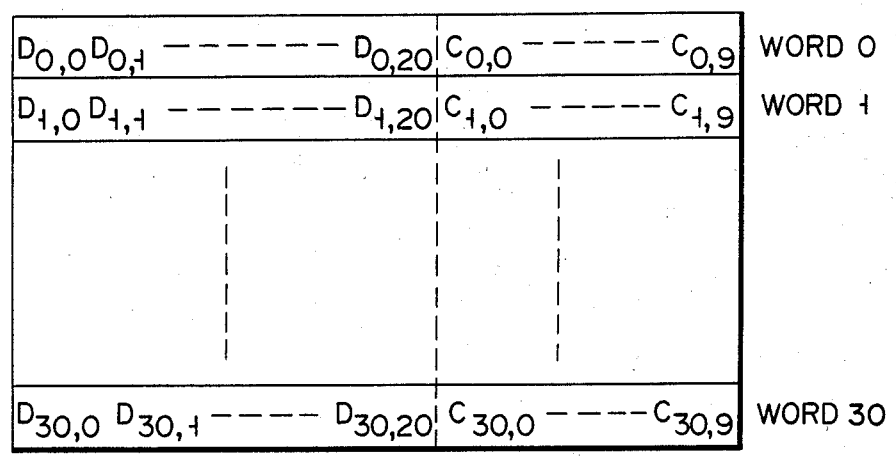
FIG. 8 shows a record format for 31-bit interleaving.

Further, in converting a burst error on the disk into a single error (for a burst length of 3 or less) in the code word, or in 2 bit errors for a burst length of 32 through 62, the code word is recorded in the optical disk, after being subjected to a 31-block interleaving process. The code word is recorded in bit serial order, by longitudinally scanning the 31 words formulated as shown in FIG. 8. Specifically, the data is recorded in the following order: $D_{0,0}, D_{1,0}, \ldots D_{30,0}, D_{0,1}, D_{1,1}, \ldots D_{30,1}, \ldots, C_{0,0}, C_{30,0}, \ldots, C_{0,9}, \ldots, C_{30,9}$. Therefore, a single burst error of up to 62 bits, or double burst errors of 31 bits or less, may be corrected.

The format, 31 bits $\times$ 31, is treated as one segment. Four segments constitute one sector. The sector is used as an addressing unit for the read and write operations. The errors in four segments of the same sector may be independently corrected, through a burst error is located astride the two adjacent segments.

Of the errors which might occur in the picture data, certain types of errors still remain, even after the error correction mentioned above.

An explanation may now be given of a word by word check of such errors. The above error correction approach cannot detect errors of three or more bits, or a multi-bit error incapable of correction. Therefore, the 21 bits word (referred to simply as a word) except the check bits for the BCH error correction code, contains no error or errors of five bits or more, after error correction. Assume now that all of the residual errors are three-bit errors, and that additional bit errors arising from the error correction are not contained in the bit error rate $10^{-8}$ of the residual error. Based on this assumption, the error rate in the word is $10^{-8} \times 21 \div 3 \simeq 10^{-7}$. This value apparently indicates the upper limit of the error rate of the word.

Next, an explanation may be given of the segment by segment check of the residual error. There are two possible causes for the occurrence of three or more bit errors in a word; one being the overlap of a long burst error of 63 bits or more with a plurality of short burst errors, and another being a mixture of this and other types of errors.

It is apparent that, by reason of the single long burst error, errors occur in successive words. For example, when the length l of the original error burst is within the following range, $63 \leq l \leq 92$, errors occur in successive words (1−62). If $l \geq 93$, all of the words within the segment will contain errors.

With a plurality of short burst errors, it is assumed that the words containing errors within the segment are randomly dispersed. In actuality, however, such a case is rare. This fact is empirically confirmed and may also be explained in the following manner. A bit error rate before the 1st error correction is $10^{-4}$. The frequency of triple errors due to the overlapping of burst errors of 31 bits or less is $31C_3(10^{-4})^3 \cong 2 \times 10^{-9}$. This is the probability of the occurrence of triple errors in the word. The probability is $2 \times 10^9 \times 1/31 \times 3 = 2 \times 10^{-10}$, in terms of the residual bit error rate. This value is much smaller than the residual bit error rate mentioned above. Hence, the major causes of the residual error are the long burst error, and an overlapping of the relatively long burst error ($32 \leq l \leq 62$) and the plurality of short burst errors. Therefore, when errors within the segment are observed word by word, those errors are frequently observed as burst errors.

The second error correction is as follows. In cases where the words with burst errors are successively present within the segment, and the number of error bits is 5 or more, the ordinary error correction code cannot be used. To cope with such cases, it is necessary to greatly increase the redundancy of the code. In the code used for the first error correction, for data of 21 bits, ten bits are additionally used, to correct 2 bits errors. The code word length is 1.48 times the number of data bits. Therefore, for the second error correction, it is necessary to use a coding system with high redundancy, in which the code length is two or more times as great.

Considering this problem from the systems side, it is very important that the size of the minimum unit of the code be properly selected, to provide for complete error correction.

The minimum unit for the read/write operation cannot be smaller than the unit used to provide complete error control. From the systems side, it is desirable to set the minimum unit for the read/write operation to 128 bytes, just as in the case of the minimum unit of the floppy disk. One segment of the optical disk is 21 bits $\times 31 = 651$ bits $= 81$ bytes. Therefore, it is desirable to perform error correction control with the unit of one sector being equal to 324 bytes of the optical disk.

Figure 9:
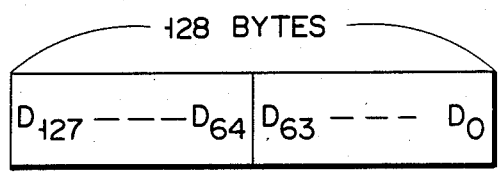
FIG. 9 illustrates a format of a read/write data unit for an application program.

The second error correction, which is performed in the CPU 12, the main memory 13 and the optical disk unit 22, may be described as follows. To cope with the above problems, the second error correction is based on a doubling of the record of the coded data and the error detection. Specifically, the coded data is doubly recorded, with error detection codes attached thereto. The physical space between the coded data doubly recorded is set as long as possible, so that the single long burst error will not effect both items of data. The read and write operations of the application program are performed with an access unit of 128 bytes, as shown in FIG. 9. The driver routine for the optical disk device is sent, in the format shown in FIG. 10, to the optical disk device. The flag may be used for storing an address of the control data, or may be empty. CRC3 through CRC0 are error detecting codes for the 64 byte data of each segment. For such codes, it is preferable to use a 16-bit CRC, according to recommendations of the CCITT (The International Telegraph and Telephone Consultative Comittee). Since the number of error bits is large, however, it is impossible to obtain precise error detection. The rate of error check miss is approximately $2^{-16}$. For judging the read out of the data, the doubled items of data read out from the optical disk are entirely compared with one another. When both items of data are exactly coincident with each other, it is judged that the data has been read out correctly. When the result of this comparison is noncoincidence, both items of recorded data are subjected to a cyclic redundancy check, to judge which item of recorded data is correct. In cases where only one of the CRC in one item of data is checked, and the data is employed on the basis of the judgement that the CRC is correct, the data checking suffers from a data check miss, on the order of $2^{-16}$ (approximately $10^{-5}$). For this reason, it is essential to check the comparison and coincidence between the doubled data.

Figure 11:
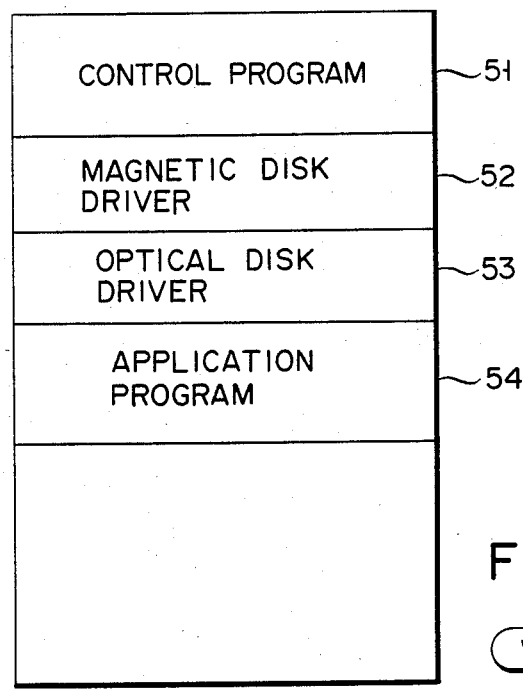
FIG. 11 is a memory map of a program executed by the CPU.

FIG. 11 shows a memory map of a program executed by the CPU 12. As shown, this program is composed of a control program 51 forming an operating system, a magnetic disk driver routine 52, a driver routine 52 for a magnetic disk, a driver routine 53 for an optical disk, and an application program 54.

Figure 10:
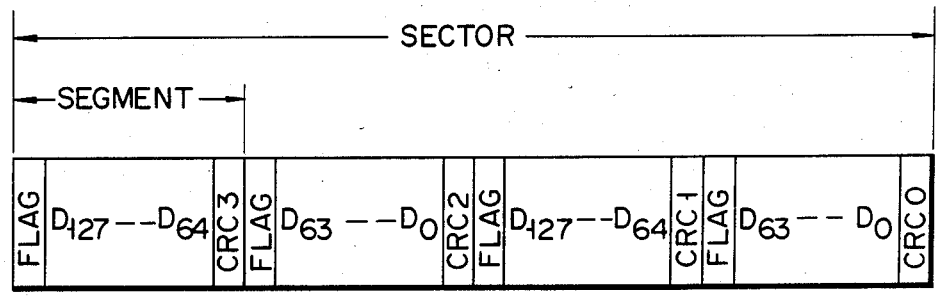
FIG. 10 shows an example of a data format used in a driver routine.
Figure 12:
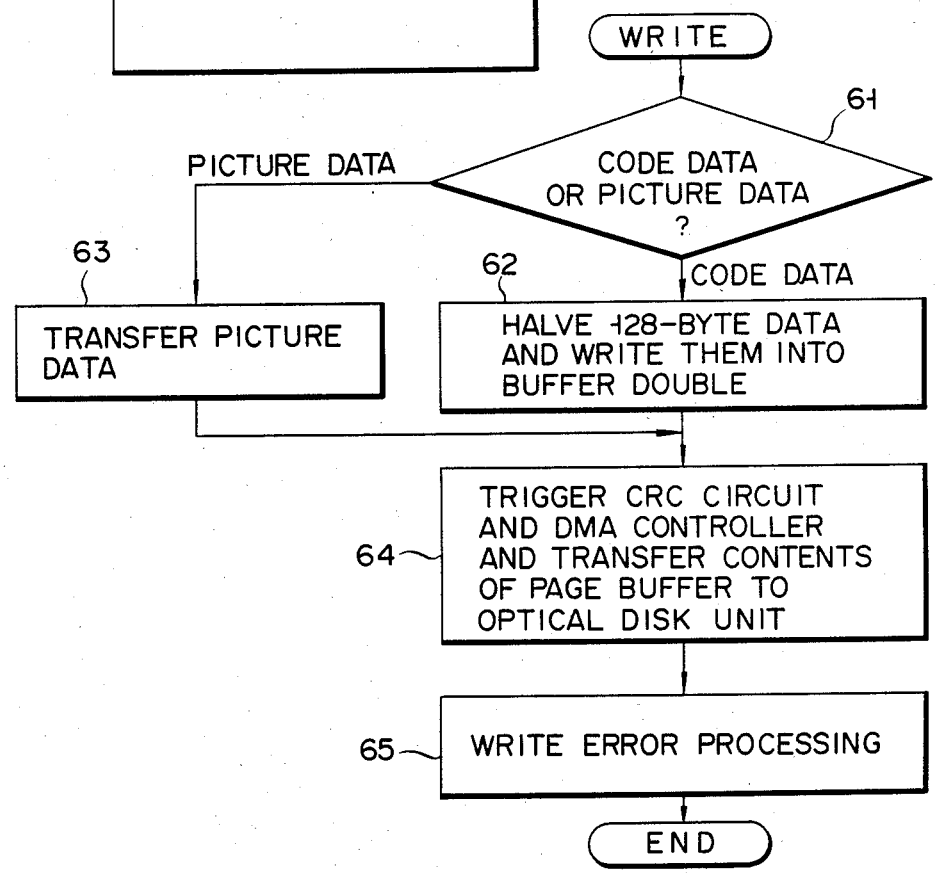
FIG. 12 is a flowchart illustrating the control flow of a write operation.
Figure 13:
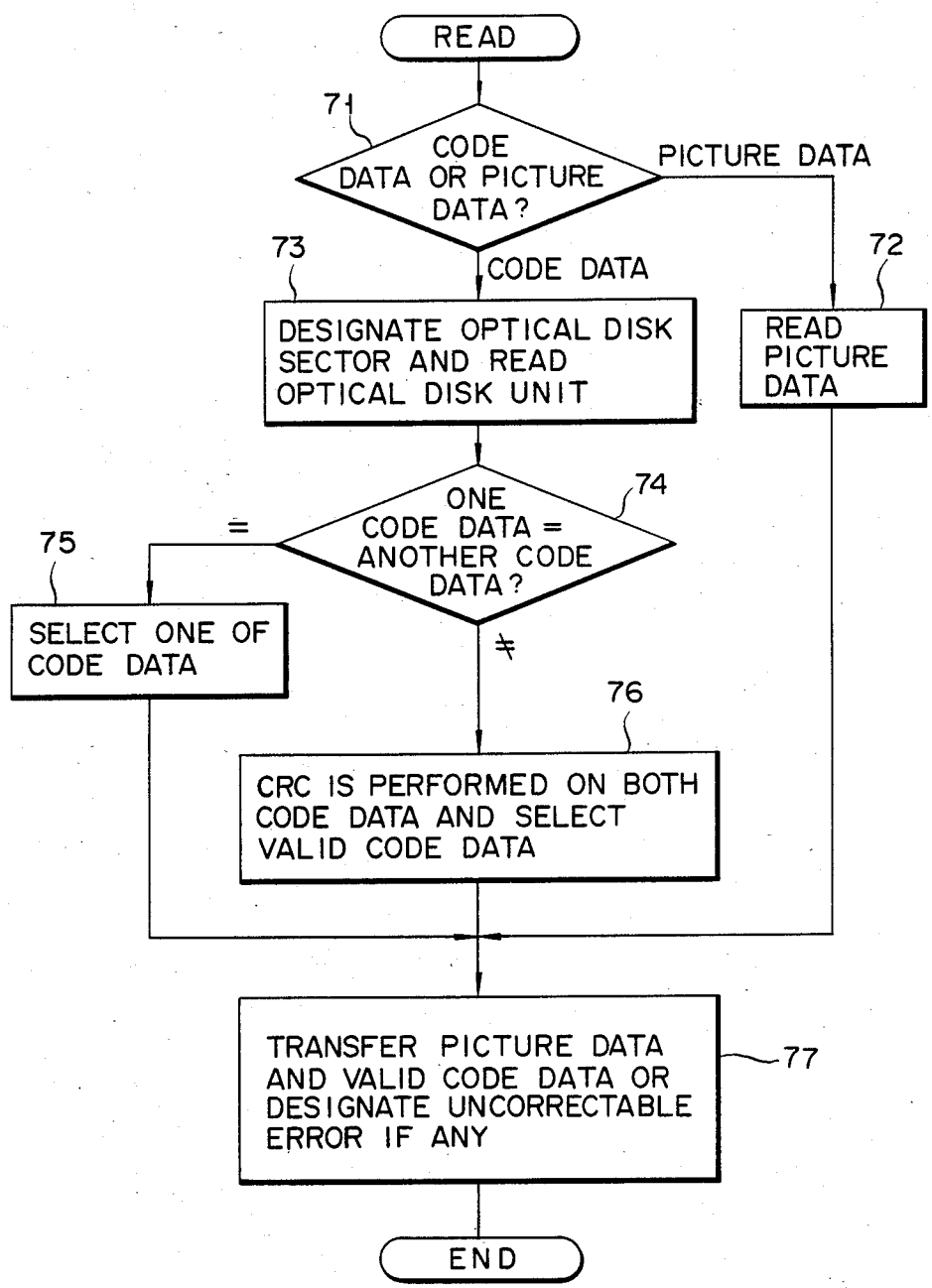
FIG. 13 is a flowchart illustrating the control flow of a read operation.
Figure 14:
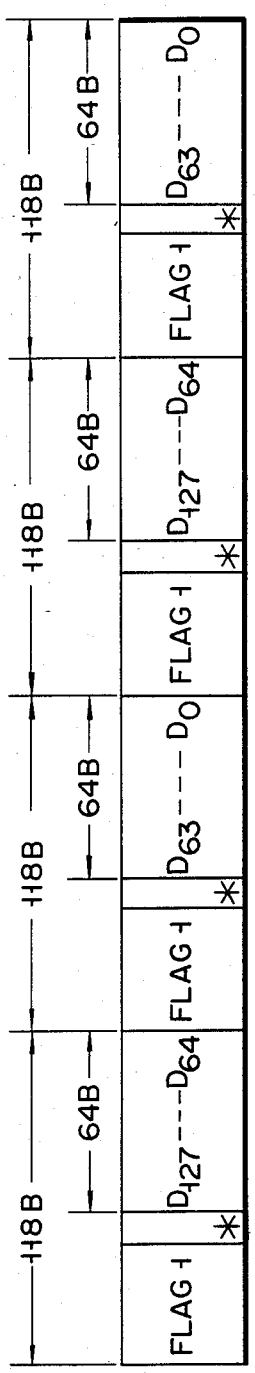
FIG. 14 shows a format for doubling the code data.
Figure 15:
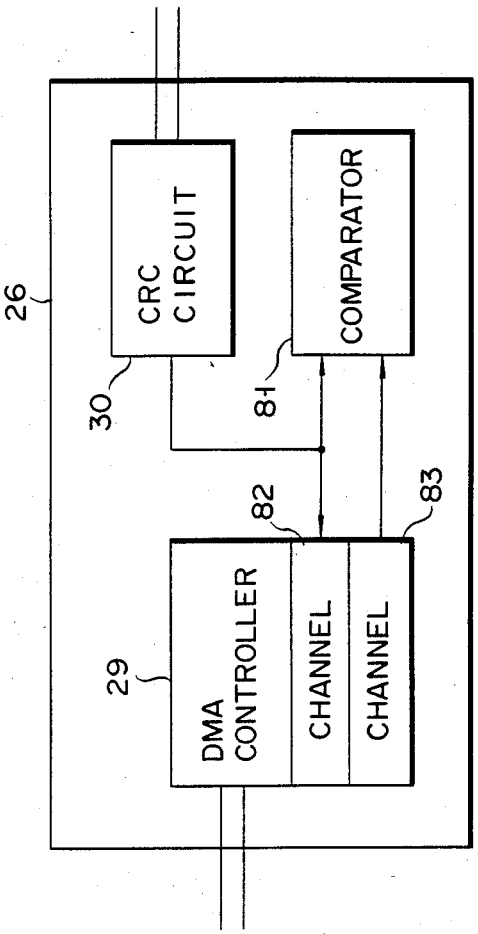
FIG. 15 is a block diagram of an optical disk unit adaptor of another embodiment of a data processing system according to the present invention.

The operation of an embodiment of the present invention may be described as follows, with reference to the flowcharts of FIGS. 12 and 13. The flow chart shown in FIG. 12 illustrates the control flow occurring when the picture data and code data is written into the optical disk 19. To begin with, in step 61, it is judged whether the input data is code data or picture data. When it is code data, in step 62, the data of 128 bytes (FIG. 9) received from the application program is halved, and the halved items of data are doubly loaded into the page buffer 14, according to the format of FIG. 14. In this example, the flag 1 in FIG. 10 is composed of 52 bytes, and stores, for example, a file ID when a file is opened from the application program. The flag 2 of 2 bytes is used for recording a serial number of a 128 bytes record in a file by counting up in a driver routine on the basis of the initial value applied from the application. In this example, there is a considerable difference between a conventional optical disk format and the 128 byte length record of the CPU. Therefore, the flag field appears to have a relatively large area in the format. The reason such a format is used is that, when considering such use in terms of the overall system, the amount of code data is greatly reduced. In step 64, the DMA controller 29 and the CRC circuit 30 are triggered. Then, the DMA the controller 29 sequentially reads out the data of 118 bytes, as shown in FIG. 10, and sends this data to the CRC circuit 30. The CRC circuit 30 computes the CRC of the data. The CRC which is thus computed is added to the original data of 118 bytes. The optical disk unit 22 performs the first error correction of the data received, and then writes the data onto the optical disk. While one sector of the optical disk has $31 \times 31 \times 4 = 3844$ bits, as described above, the data sent from the optical disk unit 26 has $8 \times 120 \times 4 = 3840$ bits. "0" is written into these remaining four bits. Then, in a step 65, a general post processing such as an error processing in a write mode, is performed. In this example, the write operation is described using the flowchart shown in FIG. 12, for the sake of simplicity. Actually, however, to improve the efficiency of the write operation, a known technique is used for this write operation. For example, the interrupt is applied to the interrupt acceptable portion of the write operation. Further, the processing of the next 128 bytes record processing is performed concurrently with the read/write access to the optical disk unit 22. When the input data is the picture data of step 61, the picture data, being intact, is transferred to the page buffer 14. Then, the CPU proceeds to step 64.

The read operation may be described as follows, with reference to the flowchart of FIG. 13. In step 71, it is judged whether the input data is picture code or code data. When it is code data, a predetermined optical disk sector is designated in block 73, and the optical disk unit 22 is driven. The optical disk unit 22 performs the first error correction. The code data received from the optical disk unit 22 is applied to the CRC 30, where the CRC code is being computed. The computed CRC code and the CRC code recorded at the time of writing are compared, to judge whether the read out data is correct or not. The code data is stored in the main memory 13 by the DMA controller 29. The CRC 30 informs the CPU 12 of the results of the CRC check as a status. In step 74, the CPU 12 compares the doubled portions of the read out data, i.e., data $D_{127}, \ldots, D_{64}$ and data $D_{63}, \ldots, D_6$, to thereby check where an error is contained or not. The entire data $D_{127}$ to $D_0$ are compared, in addition to the CRC check. When the result of the comparison is the coincidence between them, one of the data is selected in a step 75. When the comparison indicates noncoincidence in step 76, the results of the CRC check are checked. When one item of code data has an error, the other valid item of code data is selected. Where the results of comparison indicate noncoincidence, and the CRC check indicates that both items of data are correct, the error in question is deemed uncorrectable. Then, in the next step 77, the correct data is transferred to the application program, with the occurrence of an uncorrectable error being prevented. When, in step 71, the input data is picture data, the ordinary picture data readout is performed in step 72. The data so read out is transferred to the application program, in step 77.

In the above-mentioned embodiment, the comparing check in a write mode is executed by the driver routine 53, which is executed by the CPU 12. Alternatively, this routine 53 may be executed by the hardware. In an optical disk adaptor, the DMA 29 has a plurality of channels 82, 83. Channel 82 is used for transferring the data coming from the optical disk unit 22 to the main memory 13. In the latter half of each sector read, channel 83 again reads out the data written by channel 82 for the comparison of the data, in synchronism with the data sent to channel 82.

In this example, each sector produces an excess of 4 bits. The excess bits must be divided into two-bit groups for the first and second halves of the sector. Specifically, additional clocks corresponding to 2 bits must be applied to the optical disk unit 22, at the center and at the end of the sector.

What is claimed is:

1. A data processing system designed to handle a large amount of high-redundant data which allows for a low frequency of occurrence of errors, and a small amount of low-redundant data which allows for a very low frequency of occurrence of errors, which data processing system has a memory device with a large capacity for storing high-redundant and low-redundant data at an insufficiently low frequency of error, said data processing system comprising:

first error correction means for correcting the errors of said high- and low-redundant data, so that said high- and low-redundant data may be set within a tolerable error range when said high- and low-redundant data are read out from or written into said memory device; and second error correction means for double recording the low redundant data onto said memory device and for executing error correction on each item of the double-recorded low redundant data.

2. A data processing system according to claim 1, wherein said second correction means comprises:

comparing means for comparing the double-recorded data; and means for performing a cyclic redundancy check on each item of the double-recorded low-redundant data, when the results of the comparison indicate noncoincidence between said double-recorded data.

3. A data processing system according to claim 1, wherein said second correcting means doubly records said low-redundant data in said memory device, reads both of said doubly recorded values from said memory devices, and performs an error correction routine on each item of said doubly recorded read values.

4. In a data processing system designed to handle a large amount of high-redundant data which allows for a low frequency of occurrence of errors, and a small amount of low-redundant data which allows for a very low frequency of occurrence of errors, which data processing system has a memory device with a large capacity for storing high-redundant and low-redundant data at an insufficiently low frequency of error, a method of processing data comprising the steps of:

(1) correcting the errors of said high- and low-redundant data so that said high- and low-redundant data may be set within a tolerable error range when said high- and low redundant data are read out from or written into said memory device;

(2) recording the low-redundant data onto said memory device twice; and (3) executing error correction on each item of the double recorded low-redundant data recorded by said recording step (2).

5. A method as in claim 4 wherein said executing step (3) includes the steps of:

reading both of the data recorded by said recording step (2):

comparing the double-recorded data; and performing a cyclic redundancy check on each item of the double recorded low-redundant data when the results of the comparison performed by said comparing step indicate noncoincidence between said double-recorded data.

6. A system for processing digital values comprising:

memory means for storing digital values;

first error checking means for performing an error checking routine on a first digital value, said routine producing a first result in response to said first value;

means for storing said first value together with said first result in said memory means;

means for reading said stored first value and stored first result from said memory means;

second error checking means for performing said error checking routine on said first value read by said reading means, said routine producing a second result in response to said read first value; and processing means for determining if said first result read by said reading means is equal to said second result produced by said second error checking means, and for selecting said read first value in response to a determination that said read first result and said second result are equal.

7. A system as in claim 6 wherein said processing means also compares said first value and first result read by said reading means with a reference value, and selects said read first value when said read first value and first result correspond to said reference value.

8. A system for processing digital values comprising:
means for receiving a first digital value to be processed;
means for copying said first digital value to obtain a second digital value;
first error checking means for performing an error checking routine on said first digital value, said routine producing a first result in response to said first value, and for performing said error checking routine on said second digital value, said routine producing a second result in response to said second value;
memory means for storing digital values;
means for writing said first digital value together with said first result in said memory means and for writing said second digital value together with said second result in said memory means;
means for reading said stored first digital value and stored first result, and for reading said stored second digital value and stored second result from said memory means; and
control means for:
determining if the first value and first result read by said reading means are equal to the second value and second result, respectively, read by said reading means,
selecting one of said read first value and said read second value if said read first value and read first result are equal to said read second value and read second result, respectively, and
in response to a determination that said read first value and read first result are not equal to said read second value and read second result:
  (a) performing an error checking routine on said read first value, said routine producing a third result in response to said read first value,
  (b) determining if said read first result and said third result are equal,
  (c) if said read first result and said third result are equal, selecting said first read value,
  (d) performing an error checking routine on said read second value, said routine producing a fourth result in response to said read second value,
  (e) determining if said read second result and said fourth result are equal, and
  (f) in response to a determination that said read second result and said fourth result are equal, selecting said read second value.

9. A method for processing digital values comprising the steps of:
(1) performing an error checking routine on a first digital value, said routine producing a first result in response to said first value;
(2) storing said first value together with said first result in a memory device;
(3) reading said stored first value and said first result from said memory device;
(4) performing said error checking routine on said first value read by said reading step (3), said routine producing a second result in response to said read first value;
(5) determining if said first result read by said reading step (3) is equal to said second result produced by said performing step (4); and
(6) selecting said first value read by said reading step (3) if said determining step (5) determines said read first result is equal to said second result.

10. A method as in claim 9 wherein:
said method further comprises the steps of comparing said first value and first result read by said reading step (3) with a reference value, and selecting said read first value if said read first value and first result are equal to said reference value; and
said performing step (4), determining step (5) and selecting step (6) are performed only if said comparing step determines said read first value and first result do not correspond to said reference value.

11. A method for processing digital values comprising the steps of:
(1) receiving a first digital value;
(2) copying said first digital value to obtain a second digital value;
(3) performing an error checking routine on said first digital value, said routine producing a first result in response to said first value;
(4) storing said first digital value together with said first result in a memory device;
(5) performing said error checking routine on said second digital value, said routine producing a second result in response to said second value;
(6) storing said second digital value together with said second result in said memory device;
(7) reading said first digital value and first result stored by said storing step (4) and said second digital value and second result stored by said storing step (6) from said memory device;
(8) determining if the first value and first result read by said reading step (7) correspond to the second value and second result, respectively, read by said reading step (7);
(9) if said determining step (8) determines said read first value and read first result correspond to said read second value and read second result, selecting one of said read first value and said read second value; and
(10) if said determining step (8) determines said read first value and first result do not correspond to said read second value and read second result, performing the following steps:
  (a) performing said error checking routine on said read first value, said routine producing a third result in response to said read first value,
  (b) determining if said read first result and said third result correspond, and
  (c) if said determining step (b) determines said read first result and said third result correspond, selecting said read first value.

12. A method as in claim 11 wherein said performing step (10) further includes the steps of:
(d) performing said error checking routine on said read second value, said routine producing a fourth result in response to said read second value;
(e) determining if said read second result and said fourth result correspond, and
(f) if said determining step (e) determines said read second result and said fourth result correspond, selecting said read second value.

* * * * *